(12) United States Patent
Caridis et al.

(10) Patent No.: US 6,467,401 B2
(45) Date of Patent: Oct. 22, 2002

(54) TOSTADA FORMING AND COOKING

(75) Inventors: Andrew A. Caridis, San Carlos; Daniel E. Brown, San Mateo; John Silvester, Hayward; Anthony A. Caridis, Belmont; Larry Klein, Hillsborough, all of CA (US)

(73) Assignee: Heat and Control, Inc., Hayward, CA (US)

( * ) Notice: Subject to any disclaimer, the term of this patent is extended or adjusted under 35 U.S.C. 154(b) by 0 days.

(21) Appl. No.: 09/804,833

(22) Filed: Mar. 13, 2001

(65) Prior Publication Data
US 2002/0129713 A1 Sep. 19, 2002

(51) Int. Cl.$^7$ ................................. A47J 37/12
(52) U.S. Cl. ............................ 99/353; 99/404; 99/407; 99/427
(58) Field of Search ........................... 99/330, 353–355, 99/403–407, 410, 427, 443 C; 198/456, 636, 719; 426/438, 439, 502, 505, 509, 510

(56) References Cited

U.S. PATENT DOCUMENTS

| | | | |
|---|---|---|---|
| 1,919,185 A | | 7/1933 | Chapman |
| 2,112,309 A | | 3/1938 | Santillan |
| 2,512,591 A | | 6/1950 | Alexander |
| 2,570,374 A | | 10/1951 | Pompa |
| 2,603,143 A | | 7/1952 | Saenz |
| 2,700,939 A | | 2/1955 | Liston |
| 2,907,268 A | | 10/1959 | Doolin |
| 2,967,474 A | | 1/1961 | Ford |
| 3,132,949 A | | 5/1964 | Crowe |
| 3,162,297 A | | 12/1964 | Leach |
| 3,267,836 A | | 8/1966 | Yepis |
| 3,292,769 A | | 12/1966 | Zuppiger |
| 3,323,633 A | | 6/1967 | Engel |
| 3,570,393 A | | 3/1971 | Schy |
| 3,576,647 A | | 4/1971 | Ciepa |
| 3,602,130 A | | 8/1971 | Perez |
| 3,635,638 A | | 1/1972 | Bryan |
| 3,680,474 A | | 8/1972 | Brown |
| 3,722,400 A | | 3/1973 | Jiminez |
| 3,763,764 A | | 10/1973 | Schy |
| 3,766,846 A | | 10/1973 | Jiminez |
| 3,785,273 A | | 1/1974 | Stickle |
| 3,795,303 A | | 3/1974 | Taggart |
| 3,880,065 A | | 4/1975 | Stickle |
| 3,928,638 A | | 12/1975 | Stickle |
| 3,946,655 A | | 3/1976 | Schy |
| 3,947,241 A | * | 3/1976 | Caridis ..................... 99/443 C |
| 4,154,153 A | | 5/1979 | Stickle |
| 4,160,043 A | | 7/1979 | Stickle |
| 4,167,585 A | * | 9/1979 | Caridis .................. 426/438 X |
| 4,184,418 A | | 1/1980 | Jiminez |
| 4,510,165 A | | 4/1985 | Caridis et al. |
| 4,554,865 A | | 11/1985 | Caridis et al. |
| 4,561,347 A | * | 12/1985 | Zaitu .......................... 99/352 |
| 4,584,931 A | * | 4/1986 | Feehan ........................ 99/355 |
| 4,882,984 A | * | 11/1989 | Eves, II ....................... 99/404 |
| 4,913,042 A | * | 4/1990 | Miller ......................... 99/404 |
| 4,942,810 A | * | 7/1990 | Zittel et al. ................... 99/477 |
| 5,020,426 A | * | 6/1991 | Cope et al. ................... 99/353 |
| 5,322,006 A | * | 6/1994 | Morioka et al. .......... 99/404 X |
| 5,419,240 A | * | 5/1995 | Moishita et al. .............. 99/404 |
| 5,743,174 A | * | 4/1998 | Stickle ..................... 99/353 X |
| 6,062,132 A | * | 5/2000 | Morris ......................... 99/404 |
| 6,152,023 A | * | 11/2000 | Lihotzky-Vaupel .......... 99/404 |

* cited by examiner

Primary Examiner—Timothy F. Simone
(74) Attorney, Agent, or Firm—Donald N. MacIntosh

(57) ABSTRACT

Cooking and simultaneously forming a tostada or taco product in a cooking oil bath by inserting a pliable tortilla between adjacent molds when opened in a clamshell action, then closing the molds and conveying them through an oil bath and then opening the molds and removing the product. While cooking, the product is captured in the space between adjacent molds and permitted to cook into the desired shape. An interchange of conveyor carried molds is disclosed whereby the cooking equipment may process different product sizes and shapes.

11 Claims, 10 Drawing Sheets

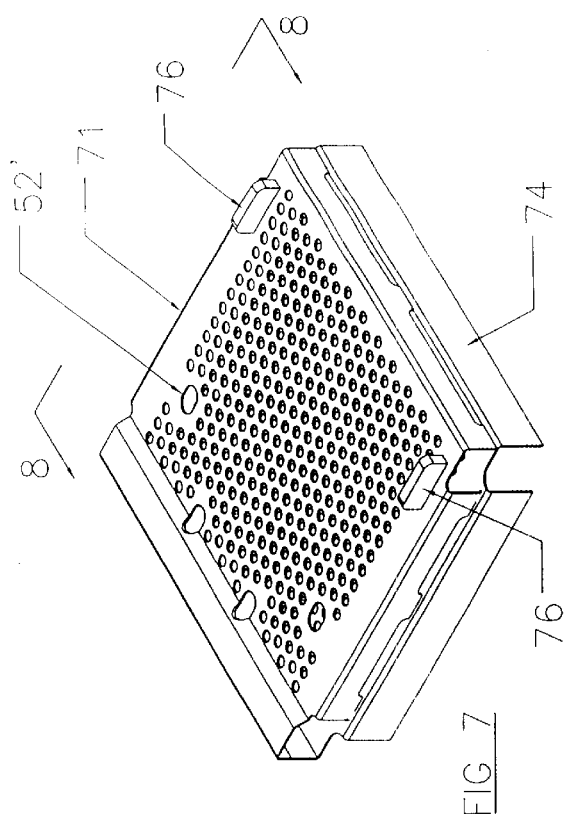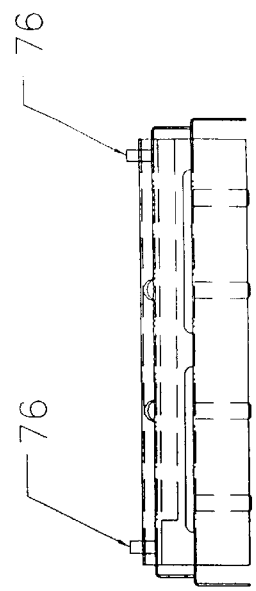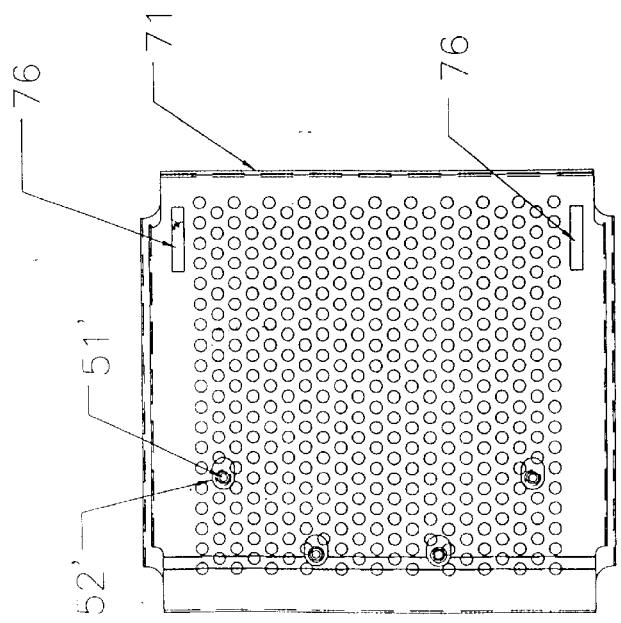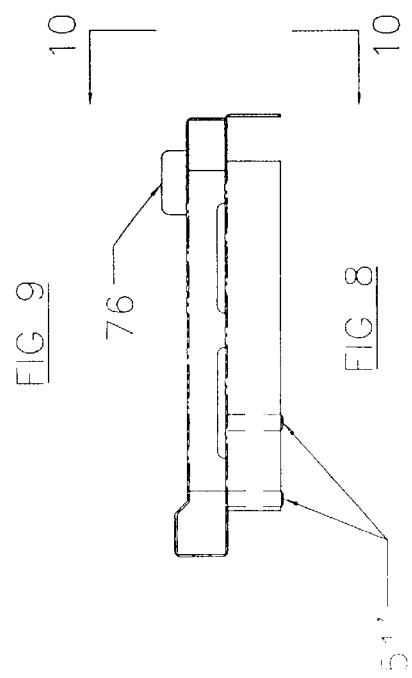

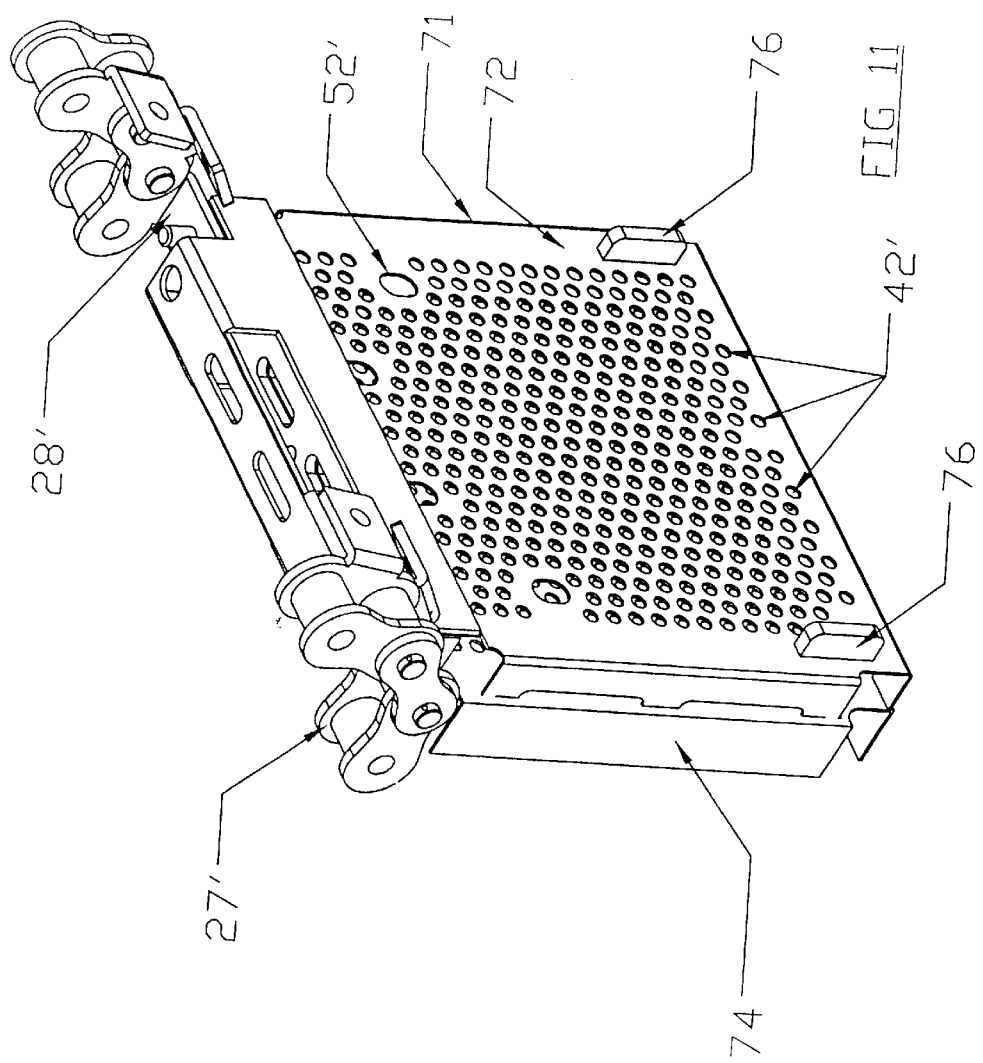

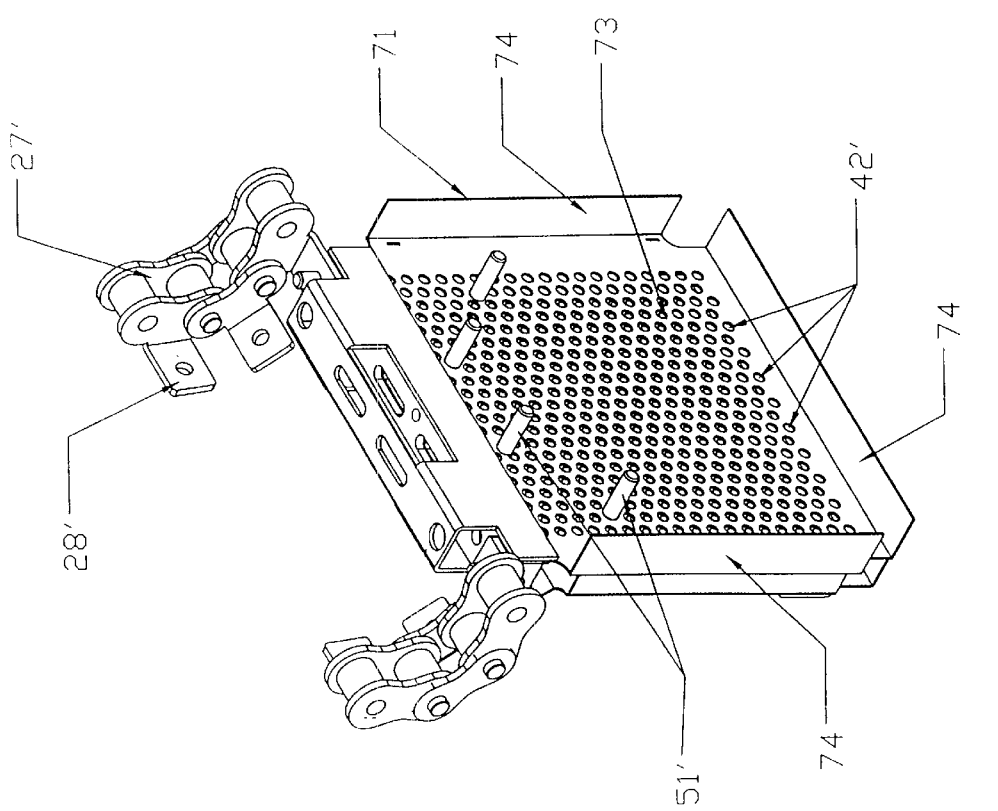

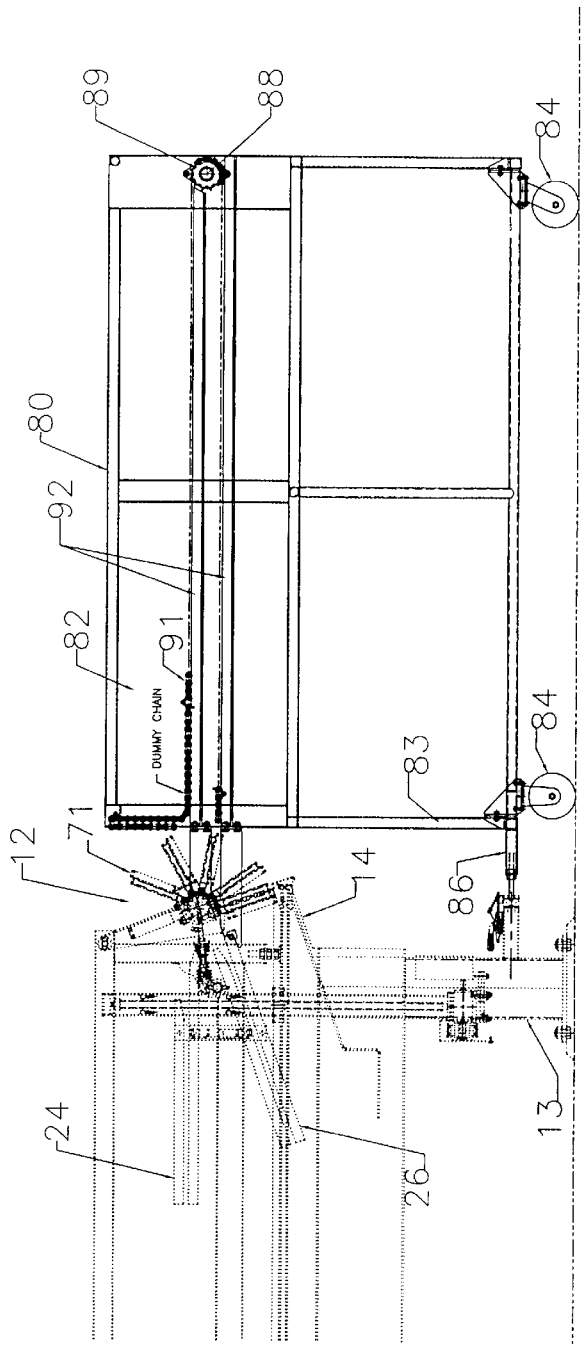
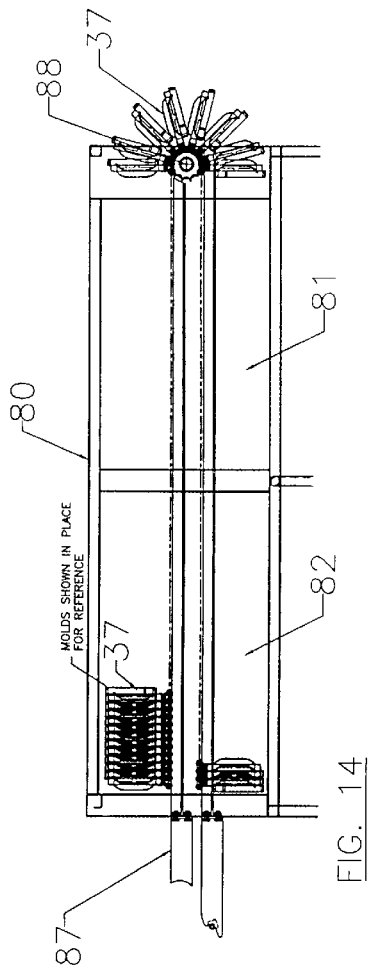
FIG. 13
FIG. 14

TOSTADA FORMING AND COOKING

FIELD OF THE INVENTION

This invention concerns treating tortillas and specifically relates to forming and cooking tortillas at a high volume, transforming them into tostada shells that serve as edible supports for salad like dishes.

BACKGROUND OF THE INVENTION

U.S. Pat. Nos. 4,510,165 and 4,554,865 granted Apr. 9 and Nov. 26, 1985, respectively, to the assignee of the present invention were directed to the forming and cooking of taco shells. The apparatus and method disclosed in those patents were successful in high volume production of taco shells from the starting tortilla pieces. The later, in a substantially limp condition, could be positioned for capture by the male of the male-female pair of momentarily opened, complimentary forming molds. When closed into their nesting relationship, the forming molds bent the tortilla pieces into the characteristically U-shaped taco shells. The closed molds coupled to a conveyor carried the taco shells for cooking along a path through a bath of hot cooking oil. Upon exit from the cooking oil the forming molds opened from the nesting condition and the cooked taco shells were released from the molds and removed onto a takeaway conveyor.

Both taco and tostada shells are formed from tortillas but on the one hand taco shells are typically the characteristic deep U shape whereas tostada shells are a shallow, broad saucer shape, sometimes polygonal in outline and at other times having a circular outline with a fluted edge. Although both these Mexican derived food products are similar in a broad general sense, tostada forming and cooking requires different handling of the tortilla in order to achieve a consistently uniform product as demanded in high volume commercial production, 2,000 dozen per hour, for example.

The prior art of taco forming apparatus taught the design, purchase and use of complete mold sets dedicated to a small size range of taco shells with the result that entire forming and cooking equipment was designed to produce taco shells restricted to a single size of, say from either a 5 or a 6 inch diameter, tortillas. Should market and production requirements dictate different sizes of tortilla based products, an 8 inch diameter taco shell for example, completely separate and cooking and forming machines were required to accommodate those different sizes. This involved dedicating a large capital investment in forming and cooking equipment restricted solely to each of the different sized products. It would be an advancement if in the case of forming tostada shells from tortillas, where producers and the market desire a variety of tostada shapes, that the investment in equipment would not be completely duplicated for each of the is needed tostada shell shapes or sizes. Moreover, from a food processing plant operational standpoint it is very desirable to have flexibility in the capability of producing several different shapes or sizes of tostada shells through a quick equipment change-over routine from one shape or size of shell to another while using substantially the same cooking apparatus and cooking oil system as well as the same input and take away conveying systems in the plant. For example, the plant operator may wish to shift production from tostada shells over to taco shells and it is highly desirable that this may be readily accomplished using the same oil heating and cooking apparatus.

SUMMARY OF THE INVENTION AND OBJECTS

In its process aspects the invention concerns the simultaneous cooking and forming of tostada shells or the like through providing a bath of cooking oil heated to a cooking temperature, providing in a pliable, but partially toasted or otherwise heat treated condition, a supply of tortillas, and inserting the tortillas, in a series one at a time, into the openings between complimentary male and female molds in their opened condition mounted upon a conveyor, moving the molds into a closed yet spaced apart condition thereby capturing the tortillas in a cooking and forming space, moving the molds and tortillas contained therein through the bath of cooking oil thereby cooking and forming the tortillas into the desired shape of tostada shells, removing the tostada shells from the cooking oil, then shifting the molds into an open condition and removing the cooked shells from the molds, and taking away the tostada shells for further processing.

Another aspect of the process of this invention is providing for the forming of different sizes or shapes of tostadas or taco shells by providing in addition to the components stated above a second set of forming molds in a second conveyor array so equipped to produce products of the desired differing sizes or shapes, providing a wheeled carriage or tug having portions to receive both the first and second mentioned conveyors and the associated mold arrays, tugging the first mentioned conveyor onto the wheeled carriage, shifting the carriage so as to place the second mentioned conveyor for movement into the space formerly occupied by the first conveyor, then moving the carriage carrying the first conveyor to an out of the way position and then operating the second conveyor in the cooking and forming system to produce a product of the desired size or shape.

In its apparatus aspects the invention in summary embraces a cooker utilizing a hot oil bath as a cooking medium and equipped with an endless conveyor extending between a tortilla loading station and a cooked tostada unloading station. The conveyor has a lower run traversing the hot oil bath. Mounted on the conveyor are a plurality of complimentary pairs of forming molds of open wall construction for entry and egress of the cooking oil. The mold pairs cooperatively with the conveyor are constructed to afford an opened condition at the loading station to receive the tortillas, followed by a closed condition in which the mold sidewalls are maintained spaced apart permitting the tortilla to take on a desired cooked shaped and an opened condition at an unloading station to afford discharge of the cooked products.

A general object of the invention is to provide a highly reliable, continuously operable cooker for producing tostadas uniform in appearance and quality.

Another object of the invention is to provide for the flexible interchange of sets of forming and cooking molds employed in the production of tostada like products so that the hot oil cooker may serve usefully for cooking tostadas of different nominal sizes and shapes, and, as the need arises, to produce taco shells of various sizes.

Yet another object of the invention is to provide for an improved continuous process of preparing cooked tostadas from uncooked tortillas such that the end products are produced at a high volume and are uniform in appearance and quality.

Still another object of the invention is to provide for accurate control of the transformation of the tortilla from the flat shape into the shape of a saucer like tostada as it cooks.

A further object of the invention is to provide a tostada cooker of the type referred to above which is highly effective in large volume production but which occupies a small floor space in the production plant.

The foregoing and other objects of the invention will be more apparent from the following drawings taken in association with the detailed description below.

BRIEF DESCRIPTION OF THE DRAWINGS

FIG. 7 is a perspective view of another mold configuration useful in the present invention;

FIG. 8 is an end view taken in the direction of the arrows 8—8 of FIG. 7;

FIG. 9 is a plan view of the mold shown in FIG. 7;

FIG. 10 is a view taken in the direction of the arrows 10—10 of FIG. 8;

FIG. 11 is another perspective view of the mold unit shown in FIG. 7;

FIG. 12 is a perspective view of the mold unit shown in FIGS. 7 and 11;

FIG. 13 is an elevational view, partially schematic, showing the tostada fryer and an associated mold rack for enabling a change of mold sets with respect to the fryer shown in FIG. 1; and FIG. 14 is a view taken in the direction of the arrows, 14—14 of FIG. 13.

DESCRIPTION OF THE PREFERRED EMBODIMENTS

Figure 1:
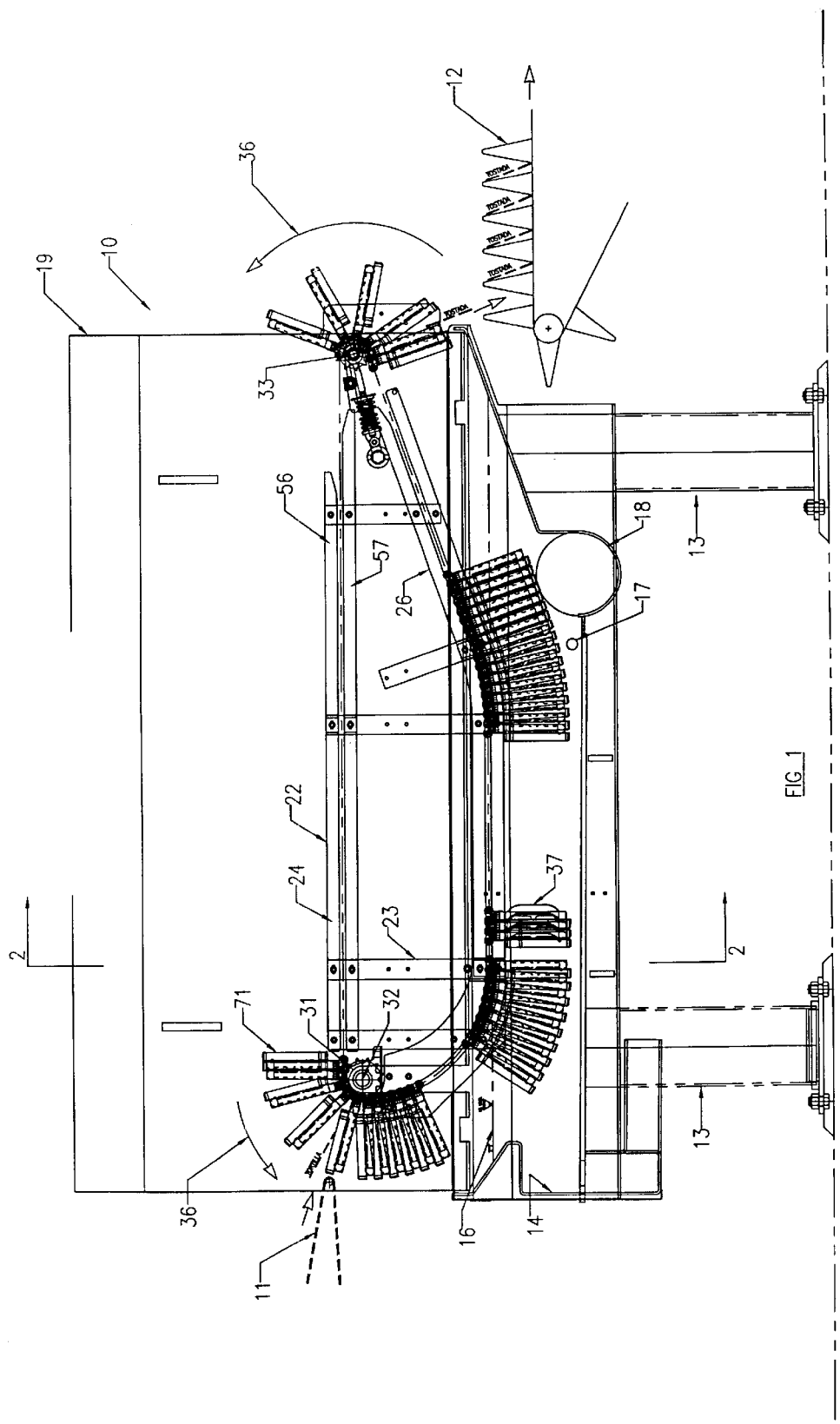
FIG. 1 is a side elevational view, partially broken away, of an improved tostada shell forming and cooking apparatus made in accordance with and embodying the principles of the present invention.

An improved tostada forming and cooking apparatus 10 made in accordance with and embodying the principles of the present invention, is shown in FIG. 1 of the drawings. Associated with the apparatus 10, is a tortilla loading station 11 and a tostada unloading or delivery station 12. An upstanding frame 13 serves to support a pan 14 that is adapted to contain a supply of cooking oil which may be of such volume to reach the level line 16. The cooking oil 16 is re-circulated between the pan 14 and a remotely located heat exchanger (not shown) through the conduits 17 and 18, and during re-circulation the oil is heated to the desired cooking temperature and filtered so as to remove particles dislodged from the product in the cooking and forming operation.

Figure 2:
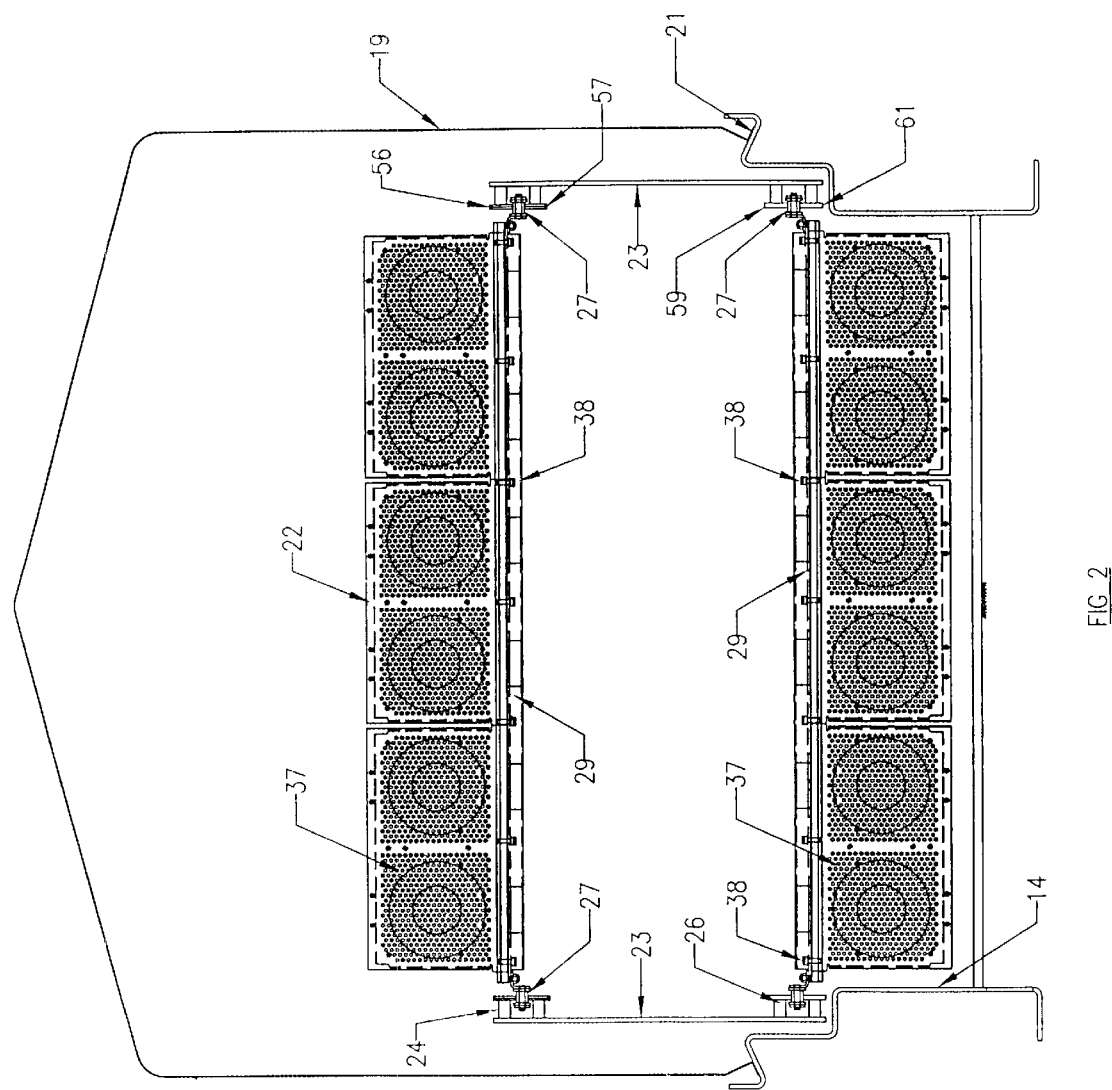
FIG. 2 is an enlarged transverse sectional view taken in the direction of the arrows 2—2 in FIG. 1.

Referring particularly to FIGS. 1 and 2, a hood 19 is mounted with respect to the pan 14 to form an enclosure for the cooking activity and more particularly to contain and control the vapors generated during the normal cooking operation. As is evident from the corner detail 21, FIG. 2, the hood 19 and pan 14 nest together when the hood is in the closed position as shown and means (not shown) are provided for raising the hood 19 away from the pan 14 for cleaning and maintenance purposes.

A conveyor structure 22 including spaced apart left and right positioned drive chains, is arranged within the hood and is supported with respect to the pan 14. The conveyor structure 22 includes left and right side frame members 23 as well as upper track-ways 24 and lower track-ways 26 shown best in FIG. 3. As clearly illustrated in FIG. 2, taken in association with FIG. 1, there is reeved in each laterally spaced apart track-way an endless roller chain 27. The roller chains ride within a slot formed in the track-ways 24, 26.

Figure 4:
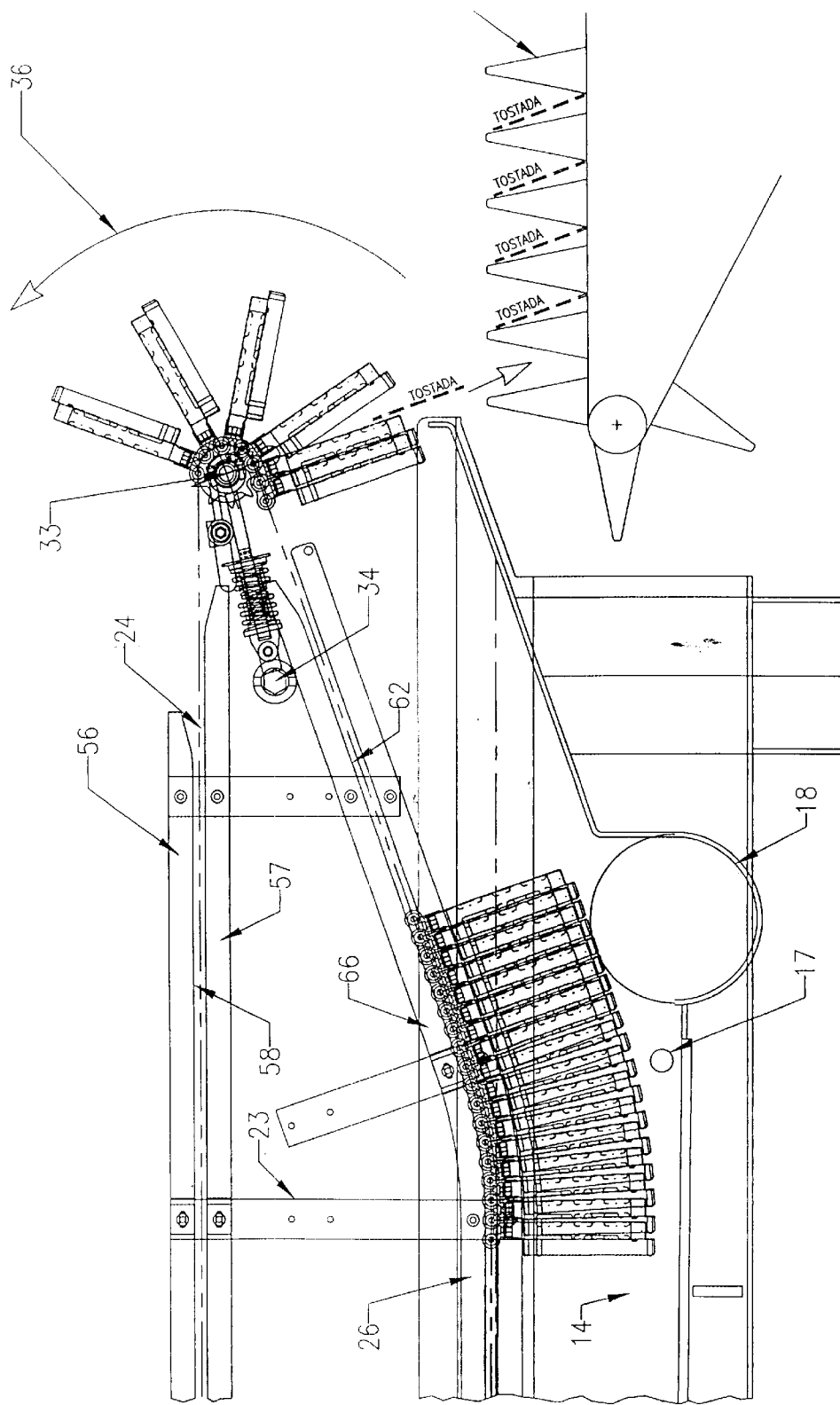
FIG. 4 is a view on the scale of FIG. 3 of the discharge end of the tostada fryer of FIG. 1.
Figure 5:
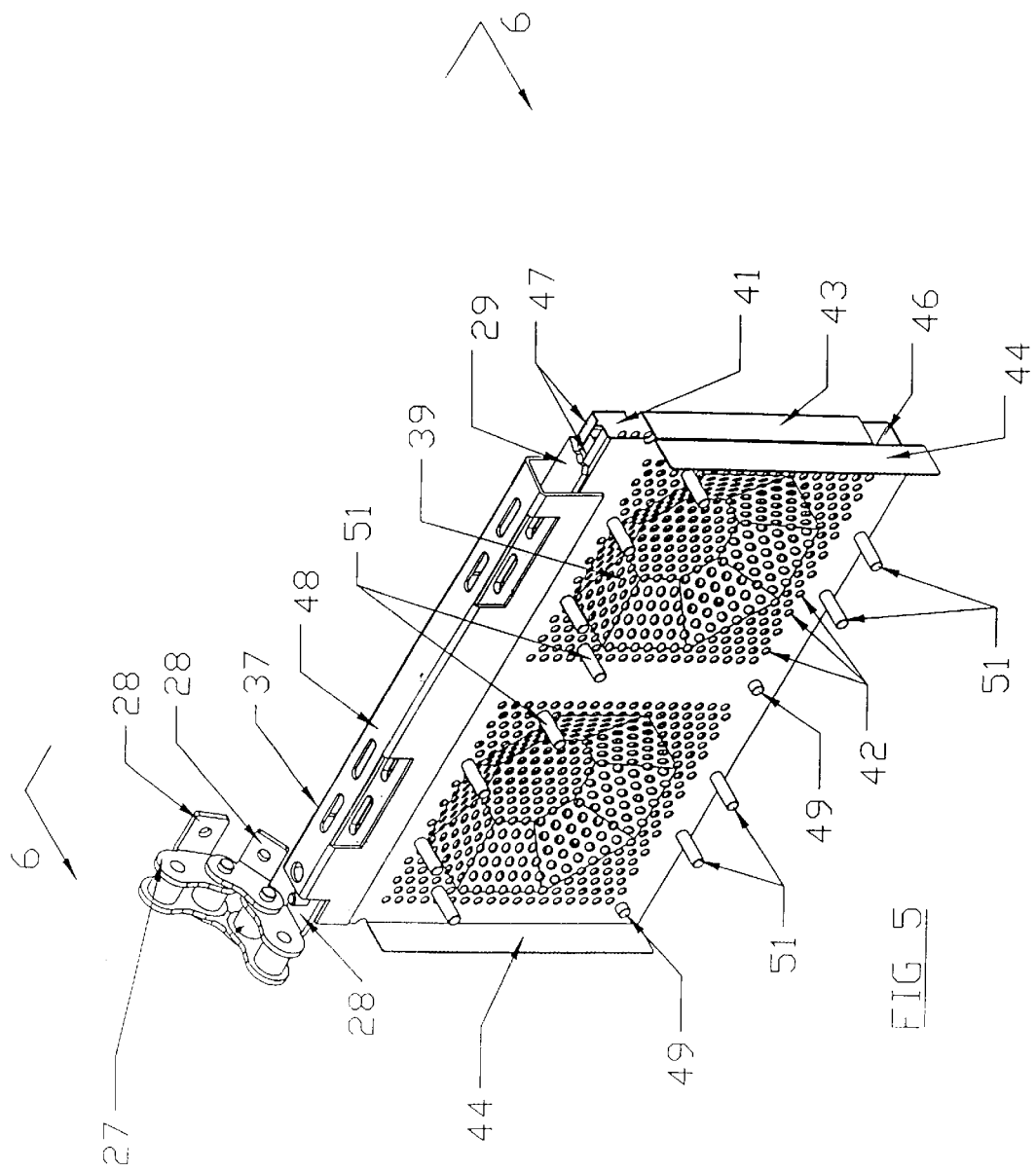
FIGS. 5 and 6 are greatly enlarged perspective views of opposite sides of a mold pair useful in the present invention.

As shown best in FIG. 5, each link in the roller chain 27 has rigidly mounted thereto an L-shaped tab 28 which serves as an attachment base upon which to mount the laterally extending cross-bars 29 that extend between and thereby connect, via suitable fasteners, with the left and right hand roller chains 27. Mounted at each end of the conveyor structure 22 is a rotatable shaft 32, 33 upon which is mounted a spaced-apart pair of sprockets 31 over which the roller chain 27 is reeved. Thus, two sprockets 31 are operatively mounted upon the drive shaft 32 and similarly upon the idler shaft 33. A chain-tensioner mechanism 34 is mounted near the discharge end 34 of the conveyor 22, as clearly shown in FIG. 4. The drive shaft 32 is driven by a variable speed motor transmission unit (not shown) so that the conveyor will advance in the direction of the arrows 36, as indicated in FIG. 1, from the tortilla loading station 11 to the tostada delivery station 12, for carrying the tortilla carrying elements through the cooking zone, the hot cooking oil in the pan 14.

Figure 6:
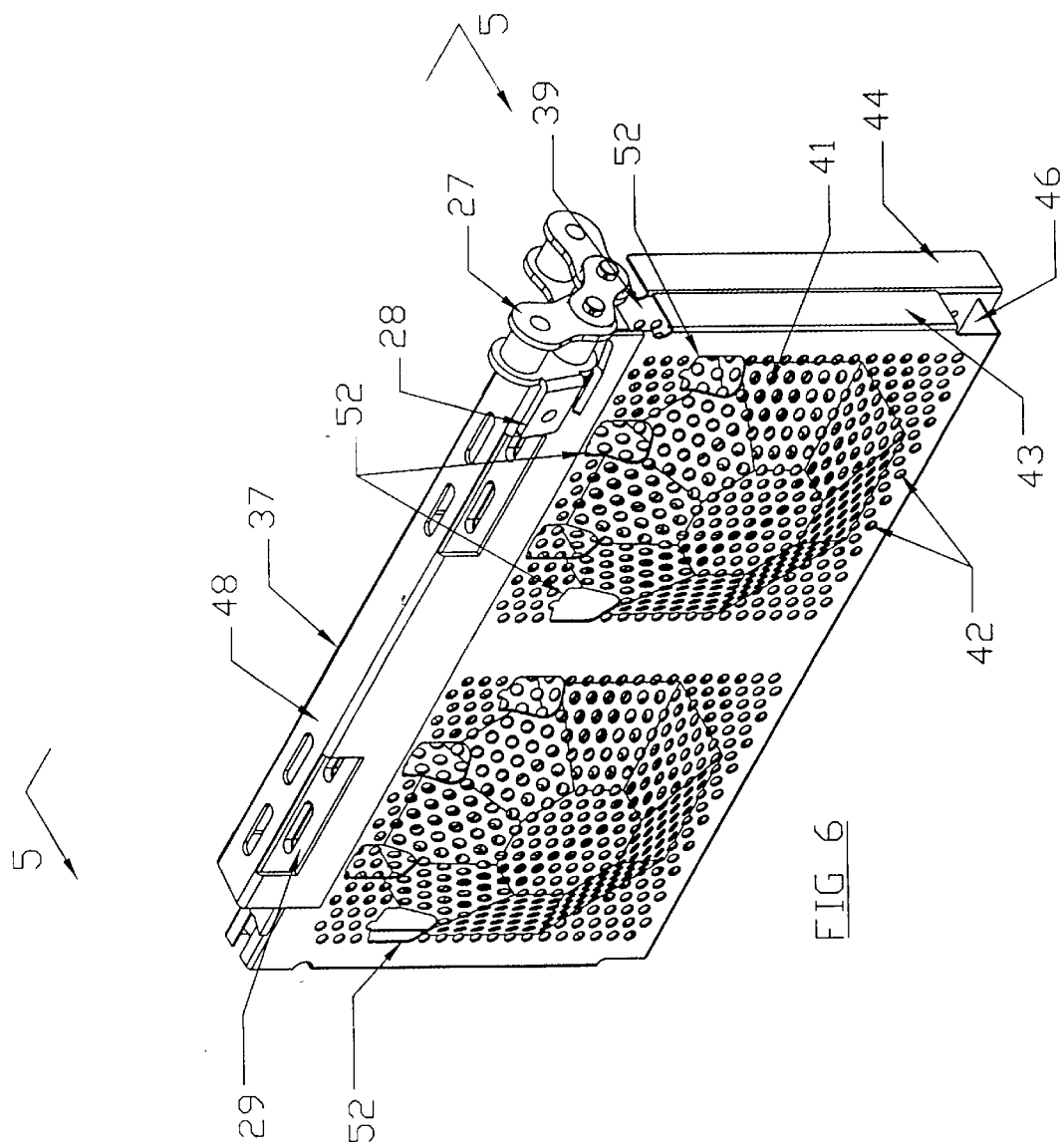

Referring particularly to FIGS. 2, 5, and 6, a plurality of mold sets 37 are fixedly secured to the conveyor cross-bars 29 by fasteners such as cap screws 38. It will be understood and on certain occasions such as in maintenance or repair or change in product size or shape it is highly desirable to have the capability of removal, replacement or substitution of one or more of the mold sets 37. This is facilitated and may be expeditiously achieved by removal of the cap screws or similar fasteners 38 and dismounting of the selected mold sets 37 from the cross bars 29. For example, this feature is advantageous should one or more of the mold sets 37 suffer operational wear or damage or when it is desired to replace one or all of the mold sets 37 to achieve a different cooked shape or some other specific purpose of the operator, the food processor.

FIGS. 2, 5 and 6 it is shown that the mold sets 37 comprise molds elements of hermaphrodite configuration, that is to say that each mold is configured to present on one side, FIG. 5, a concave female component and on the opposite side, FIG. 6, a convex male component. As shown in FIG. 2, the mold sets 37 in this embodiment are formed in lateral pairs with three lateral pairs being mounted on each cross bar 29 thus giving six mold sets extending across the cooker 10. This invention however is not limited to a six-across configuration of mold sets for the reason that it would be apparent to a worker skilled in this field that the number of mold sets may be varied to achieve a desired production output capacity of the cooker 10. Thus it is within the scope of this invention, as indicated in FIGS. 11 and 12, to have a conveyor carrying a series of single hermaphrodite molds through a cooker 10 as well as a conveyor carrying molds in lateral pairs with two, four, five, up to even eight or ten lateral pairs extending across the cooker 10, all as production requirements dictate.

FIGS. 5 and 6 depict the opposite sides of a mold set 37, FIG. 5 illustrating the concave or cavity portion 39 of the mold set and FIG. 6 illustrating the convex mold surface 41. Both the concave surface 39 and the convex surface 41 define walls of the mold 37 and are provided with a multiplicity of spaced-apart apertures 42 is which permit the flow of cooking oil into and through the mold sets 37. An end connector panel 43 is integrally formed alone one margin of the convex mold surface 41. An end spacer panel 44 is integrally formed at each end of the concave mold surface 39. A bottom connector panel 46 is integrally formed as by bending at a right angle from the convex surface 41 and is fixedly secured as by welding to the mold element 39 so as to establish thereby a box-like structure comprising the end or side panels 43 and the bottom connector panel 46. The upper portion of the mold set may be configured as illustrated in FIG. 5 with the spaced-apart in turned panels 47 defining a slot there between so as to receive connectors (not shown) for securing the mold set to the crossbar 29. A U-shaped top connector panel 48 is fixedly secured as by spot-welding to the concave and convex mold panels and is positioned as shown in FIGS. 5 and 6 so as to receive therein the carrier bar 29.

Figure 3:
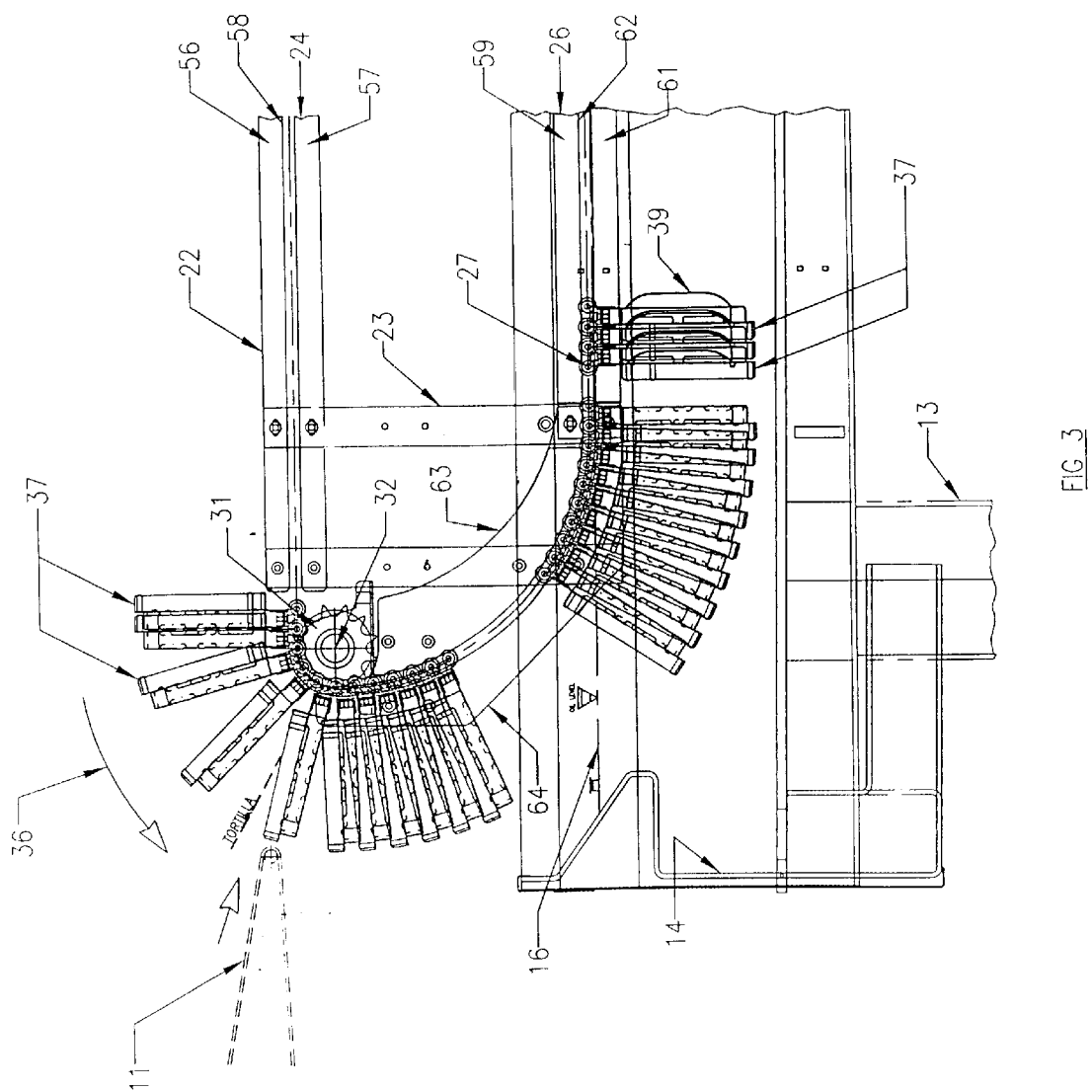
FIG. 3 is a greatly enlarged fragmentary view of the feed end of the tostada cooker of FIG. 1.

As indicated in FIG. 3, a procession of mold sets 37 are connected to the roller chains 27 and oriented so that the convex mold surface proceeds in the direction of travel 36 and thus places each concave mold surface 39 in close proximity to the next trailing mold set and in particular to the convex surface 41 thereof.

Thus it will be understood that the series of mold sets 37 on the conveyor 22 move in close proximity. However means are provided to inhibit or prevent the convex mold surface 41 of a one mold set 37 from fully engaging the concave mold surface 39 of the next adjacent mold set, in other words to provide a space between adjacent complimentary mold surfaces for forming a tortilla into a cooked tostada. To this end a plurality of abutment stops or stubs 49 are disposed in a protruding relationship near the bottom margin of the concave mold surface 39 shown best in FIG. 5. The abutment stops 39 engage the next adjacent convex mold surface 41 thus preventing full closure between the complimentary surfaces and thereby establish a cavity or pocket in which the tortilla resides during the cooking step of the process.

Also as shown in FIG. 5, a plurality of tortilla positioning pins or stops 51 are disposed in an array with, for example, two pins or stops 51 may be positioned along and extend outwardly from the lower margin of each mold in the set and four pins or stops 51 may be positioned and extend outwardly from the upper margin of the mold. As shown in FIG. 6, openings 52 for the tortilla positioning stops or pins 51 are arrange in the convex mold surface 41 so that when the molds are in a closed condition the positioning pins or stops may protrude into the openings 52. The openings are sized to permit the positioning pins 51 to move unobstructedly there through as the convex and concave mold surfaces shift relative to each other during the loading and unloading of product from the conveyor 22 at the loading 11 and unloading stations 12. The four pins or stops 51 serve to arrest the motion of the tortilla upon its placement in the mold and locates the tortilla in the optimum position with respect to the forming cavity between adjacent mold surfaces. These pins serve to prevent the tortilla from "floating" upwardly in the mold forming cavity because of its buoyancy during cooking in the hot oil. Conversely, the two stops or pins 51 along the lower margin of the mold serve to prevent the product from sliding out of the space between the mold surfaces during the cooking step.

It will be understood from the above that while cooking, the product is "captured" between adjacent convex-concave mold surfaces and located there in a positive fashion by the positioning stops or pins 51. The mold surfaces themselves are spaced apart during cooking as defined by the length of the abutments buttons or stops 49 thereby to define a forming and cooking space or cavity in which the tortilla resides between the adjacent convex and concave surfaces as described above.

FIGS. 1, 3 and 4 illustrate the structures that co-operate with the mold sets 37 as they move along on the conveyor 22 to cause them to shift from a closed together condition, such as when moving through the oil filled pan 14 in the cooking step, to the first opened condition, as indicated in FIG. 3, for receiving tortillas at the loading station 11, and again to the second or subsequent opened condition for the discharge of a cooked tostada product, as indicated in FIG. 4. To this end the upper and lower track-ways 24, 26 include the longitudinally extending bars 56 and 57 which are vertically spaced apart to define a slot 58 which serves as a guide for the roller chains 27, shown best in FIG. 2. Similarly, the lower track-ways 26 includes longitudinally extending bars 59, 61 that are vertically spaced apart to define a slot 62 serving a like purpose. These parts interact so that as the mold sets supported on the cross-bars coupled to the roller chains that traverse the generally horizontal slots 58, 62, the mold sets will remain in the "closed" condition as evident in FIG. 1. The track-way bars 56, 57 at the tostada loading portion of the conveyor terminate with their ends spaced from the drive sprockets 31. The roller chains will exit the slots 58 and engage the sprockets 31, shown best in FIG. 3. As the roller chains traverse the sprockets 31, the mold sets translate or "fan out" from the closed to the opened condition thereby providing an open "window" into which a tortilla may be inserted from the infeed conveyor 11 onto the concave or receiving surface of the mold. As the molds, now loaded with tortillas, move or translate downwardly and pass through the "nine o'clock" position relative to the drive sprockets, the adjacent molds on the conveyor line shift progressively into the closed condition.

On each side of the conveyor a contoured cam guide comprising the spaced apart plates 63, 64 affords a defined path for the roller chain so that the molds are carried downwardly into the oil bath where cooking begins. The cams guide 63, 64 afford a smooth transition for the roller chain to move downwardly from the drive sprockets onto the lower track-way 26.

Referring now to FIG. 4, each lower track-way 26 includes toward one end an upwardly inclined transition section 66 which serves as a guide for the roller chain to cause the mold sets 37 to be carried upwardly out of the cooking oil and toward the tostada delivery or unloading station 12. While moving alone the transition section 66, the mold sets 31 remain in the closed condition. When the associated roller chain links traverse the sprockets 31, the mold sets translate or "yawn" into the open condition as shown in FIG. 4. Here the tortillas now cooked and formed into tostadas can be removed from the mold sets either by gravity forces or through assistance from elements not shown such as a blast of compressed air or via contact with rotating brushes or other product removing elements. A suitable take-away conveyor mounted adjacently to the discharge end of the apparatus 10 serves to convey the cooked products for further treatment and packaging.

From the above description it will be understood that as the roller chains tars carrying the mold sets 37 traverses the sprockets 31 at the in-feed end, the adjacent mold sets pivot or "yawn" into an open condition so that products may be inserted and received therein. Accurate spacing of the product to be cooked on the in-feed conveyor and its synchronization with the conveyor 22 for the mold set openings is achieved via apparatus well known in the field and accordingly will not be further detailed. Tortillas delivered from the in-feed conveyor into the opened mold and placed on the receiving surface of the mold so as to engage the positioning pins 51. Thus the tortilla's in feed movement is arrested and the tortilla is optimally positioned on the receiving surface of the mold. Upon closing or converging of the adjacent mold surfaces as the conveyor carries the mold sets downwardly, the molds close and converge until the buttons or stops 49 engage the proximate surfaces of the adjacent mold set. The product positioning elements 51 project into the apertures 52 of the surface 41. The lower positioning pins or elements 51 serve to prevent the tortilla from dropping out into the cooking oil while being conveyed in the closed molds through the cooking oil. Similarly, the upper pins or elements 51 maintain the product in the desired position as loaded and prevent the product from upward movement with respect to the molds due to product buoyancy in the cooking oil while it is being cooked and shaped in the space permitted between adjacent molds.

In the foregoing description of the mold sets 37, as a matter of convenience the surface 39 is referring to as a concave surface and the surface 41 is referred to as a convex surface of the mold 37, as clearly shown in FIGS. 5 and 6. The general configuration of the surfaces is somewhat that of a shallow bowl or could be a deep bowl as permitted by the spacing between adjacent complimentary molds and these are only a few of the various tostada configurations that are achievable with the cooking and forming apparatus of the present invention. More particularly, another form of mold sets 71 made in accordance with and embodying principles of the present invention is shown in FIGS. 7–12. The mold configuration 71 is substantially planar on the forming surfaces and includes parts previously described and these will be marked with the same identifier numeral as used above but with a [prime] symbol. The mold sets 71 are mounted on roller chains 27' with the "L" shaped tabs 28', shown best in FIGS. 11 and 12. Whereas in the case of the mold sets 31, there was present the concave and convex mold surfaces, in the instance of the second mold configuration 71, there is a "leading" mold surface 72 and "trailing" or product receiving mold surface 73. The terminology "leading" and "trailing" refer to the direction of movement of the molds 71 through the cooking oil bath. The substantially planar mold surfaces 72, 73 are provided with a multiplicity of oil flow apertures 42'. The trailing or product receiving mold surface 73 has integrally formed on three sides marginal portions or spacer panels 74 which serve to capture the tortilla and prevent its dislodgement during the cooking step. Tortilla positioning pins 51' project from the trailing surface 73 and serve in the loading phase to arrest inward movement of the tortilla in the mold. Four such positioning pins are shown in FIG. 12, but the number may vary depending upon the size of a tortilla selected for use in the process. A bottom flange or spacer panel 74, serves a function analogous to the bottom pair of positioning pins 51 as indicated in FIG. 5. Similarly, abutment stops 76 perform a function analogous to the abutment stops 49 on the concave surface 39. The abutment stops 76 engage the next adjacent mold in the procession on the conveyor and define the void into which the tortilla will be cooked and permitted to take on the desired cooked shape of a Mexican style product.

The forming and cooking apparatus 10 may be equipped with a conveyor carrying but a single mold set such as those illustrated in FIGS. 11 and 12. This reflects the versatility of the equipment in design and operation.

The conveyor shown in FIG. 1 for purposes of illustration only is depicted with both mold configurations disclosed herein. In practice the conveyor would preferably be equipped with molds of a single type.

It is advantageous that the procession or array of mold sets 37, 71 be readily changeable to enable different shapes and sizes of tortilla based products such as tostadas and tacos to be formed in the cooker 10 so as to accommodate the varying needs and requirements of the marketplace. This feature is of great importance to the owner-operator of the cooker 10 because the capital investment in cooking and forming equipment of this type obviates the need for similar equipment for producing products of differing sizes and shapes. Thus, the savings can be substantial over employing just a single shape or size tostada or taco cooker.

For example this feature is illustrated in FIGS. 12 and 13, wherein the procession or array of mold sets 37 on the first configuration and the procession or array of mold sets 71 on the second configuration may be exchanged once the tostada cooking and forming unit 10 has been shut down for this purpose or for normal periodic servicing. The mold sets may be designed and intended to produce tacos. A swivel- wheel equipped storage and transfer carriage 80 is provided to receive the series of molds extracted from the cooker 10 for temporary storage or for servicing. The transfer carriage or tug 80 can be repositioned with respect to the cooker discharge end 12 to provide for the installation of a second series of molds into the cooker 10. To this end the storage and transfer carriage 80 is provided with two longitudinally extending bays arranged side by side, a right-hand bay 81 being shown in FIG. 14 and a left-hand bay 82 is illustrated in FIG. 13. The mold storage and transfer bays 81, 82 are,disposed within a framework 83 for the carriage 80 which is clearly shown in FIG. 13. As mentioned above, swivel wheel sets 84 are fitted to the framework 83 so as to enable the unit 80 to be shifted laterally and longitudinally with respect to the cooker 10 to facilitate the loading and unloading of the procession or array of different molds. A positive docking connection 86 mechanism is arranged between the cooker 10 and carriage or tug 80 one component thereof being secured to the upstanding cooker framework 13 and the other component being secured to the carriage 80 at the lower portion thereof as shown best in FIG. 13. The docking mechanism 86 establishes, when in the locked condition, a precise positional relationship and fixity between the moveable carriage 80 and the relative stationary cooker unit 10. An upper docking mechanism 87 couples the units 10, 80 together in an alignment such that the entire procession of molds readily may be removed or extracted from the cooker 10 and shifted onto the carriage 80.

More specifically, the carriage or tug 80 is equipped at one end with a laterally extending shaft 88 equipped with a pair of sprockets 89 spaced apart at the same distance as the pair of sprockets 31 mounted on the shaft 33. There is reeved over the sprockets 89 a pair of dummy or extractor roller chains 91 arranged to extend horizontally the full length of the carriage or tug 80 and presenting top and bottom free ends for uniting to the top and bottom runs of the roller chains 27 when these are broken open for conducting the operation of mold transfer onto the carriage 80, as shown in FIG. 13.

To remove or extract from the cooker 10, a procession of molds such as the molds 71 mounted on the pair of roller chains 27, each of chains the 27 is first opened or "broken" and then coupled to the end link from each the top and bottom runs of the dummy roller chains 91 on the carriage 80. Before this maneuver is undertaken, it will be understood that the wheeled carriage 80 is first positioned securely with respect to the cooker 10 by means of the upper 87 and lower 86 docking mechanisms so that the receiving bay 82 is properly aligned with the conveyor structure 22.

With rotation of the shaft 88, such as by a hand crank or the like (not shown) the dummy chains 91 reeved over the sprocket set 89 will withdraw from the cooker 10 the pair of roller chains 27 and the mold sets mounted there between. These move onto a set of support rails 92. Concurrently, the dummy roller chains 91 will be transferred into cooker 10 to occupy the position formerly taken by the roller chains 27 and from this it will be understood that the chains 27 and 91 are substantially the same length.

When all of the mold sets and associated roller chains have been drawn onto the receiving bay 82 of the carriage 80, the dummy chain is then present virtually entirely within the cooker 10 and its ends are uncoupled and freed from the "broken ends" or links of the mold carrying chains 27. After this step, the swivel wheel equipped carriage 80 is moved laterally so that the storage bay 81 of the carriage is positioned in alignment with the cooker 10. The dummy chains free ends extending from the cooker are then linked to the roller chains carrying the mold sets 37 which have been stored previously on the carriage 80 in the storage bay 81. Again, the sprocket equipped shaft 88 may be rotated or the motor driving the conveyor may be actuated so that the dummy chains in the cooker will draw the mold sets 37 from the carriage 80 into the cooker. In this step the dummy chains are drawn from the cooker onto the carriage 80. Thus it is apparent from the above that the cooker 10 with its associated mold storage and transfer carriage 80 is provides the food processing operator a versatile method and apparatus for producing a variety of tostada shapes and sizes which are adaptable to readily shift from one size or shape to another so as to achieve the desired production objectives.

The above descriptions of the preferred embodiments of the invention are the best known to the applicants at the time of filing this application. The description is presented for the purposes of illustration and full disclosure. It is not intended to be exhaustive or to limit the invention to the precise forms disclosed and obviously many modifications and variations are possible in light of the above teachings. The embodiments were chosen and described in order to best explain the principles of the invention and its practical application to thereby enable others skilled in the field to best utilize the invention in various embodiments and with various modifications as are suited to the particular uses contemplated. However, it is intended that the scope of the invention will be defined by the claims appended below.

What is claimed is:

1. Improved apparatus for cooking and forming tortillas into cooked tostadas, the combination comprising:
   a cooker including a tortilla loading station and a finished product tostada unloading station,
   said cooker including intermediate the loading and unloading stations a pan serving to contain a body of hot cooking oil,
   an endless conveyor extending between said tortilla loading station and said cooked tostada unloading station,
   said conveyor having a lower run traversing the hot oil bath,
   an array of complimentary pairs of forming molds with walls configured for entry and egress of cooking oil there through disposed on said conveyor,
   means on said conveyor serving to urge the mold pairs into an opened condition for receiving toasted tortillas at the loading station, then to urge the mold pairs into a closed condition for cooking, and thereafter to urge the molds into an open condition affording removal of the cooked tostada at the unloading station.

2. The apparatus of claim 1 wherein said conveyor includes means at said unloading station serving to urge said mold pairs into an upstanding procession, and conveyor drive means serving to cause the procession of molds to move continuously between said unloading and loading stations.

3. For cooking and forming apparatus for producing shaped food products including tostadas, a mold construction comprising complimentary, spaced apart, generally planar surfaces including a broad product support and receiving surface and a product capture surface,
   said surfaces being provided with a plurality of openings for circulation of cooking oil there through,
   wall means serving to maintain said surfaces spaced apart so that cooking oil may circulate between said mold surfaces,
   said molds being configured to be assembled into a procession of like molds for operation in a conveying system in an inverted position during a cooking phase,
   product location means arranged upon said product receiving surface serving to engage the product edges to constrain product movement when loading into the mold and in the inverted condition of the mold,
   spacer means on one of the mold surfaces serving to engage the next mold in the procession to establish a product forming space in which the product may take shape between adjacent molds.

4. The mold construction of claim 3 wherein said product support and receiving surface includes a central concavity and said capture surface includes a complimentary convexity.

5. The mold construction of claim 3 wherein said product location means on said product receiving surface includes a plurality of pin members upstanding from said surface, said capture surface includes a plurality of apertures configured to register with said pin members of an adjacent mold in the procession of molds.

6. The mold construction of claim 3 wherein said spacer means are, arranged on said product receiving surface.

7. Conveyor apparatus for transporting generally flat uncooked products through a bath of cooking oil, comprising
   a spaced pair of endless roller chains,
   track-way means serving to support and guide said roller chains,
   a plurality of support rods extending transversely between said roller chains, the opposite ends of each support rod being coupled to the spaced roller chains,
   an hermaphrodite mold secured to each support rod serving to establish a procession of molds, each mold including complimentary, spaced apart, generally planar surfaces including a broad product support and receiving surface and a capture surface,
   said surfaces being provided with a plurality of openings for circulation of cooking oil there through,
   wall means serving to maintain said surfaces spaced apart so that cooking oil may circulate between said mold surfaces,
   product location means arranged upon said product receiving surface serving to engage the product edges to constrain product movement when loading into the mold and in the inverted condition of the mold,
   spacer means on one of the mold surfaces serving to engage the next mold in the procession to establish a product forming space in which the product may take shape between adjacent molds.

8. The conveyor of claim 7 wherein said molds are removably mounted with respect to said support rods so that selected molds may readily be removed and replaced.

9. The conveyor of claim 7 wherein the molds are constructed such the said product support and receiving surface includes a central concavity and said capture surface includes a complimentary convexity.

10. The conveyor of claim 7 wherein the molds are constructed such that said product location means on said product receiving surfaces includes a plurality of pin members upstanding from said surfaces, said capture surfaces includes a plurality of apertures configured to register with said pin members of an adjacent mold in the procession of molds.

11. The conveyor of claim 7 wherein the molds are constructed so that said spacer means are arranged on said product receiving surfaces.

* * * * *